United States Patent
Saito

(10) Patent No.: US 7,418,570 B2
(45) Date of Patent: Aug. 26, 2008

(54) LOGICAL UNIT NUMBER INCREASING DEVICE, AND LOGICAL UNIT NUMBER INCREASING METHOD

(75) Inventor: Yoshihiro Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 351 days.

(21) Appl. No.: 11/038,135

(22) Filed: Jan. 21, 2005

(65) Prior Publication Data
US 2005/0165975 A1 Jul. 28, 2005

(30) Foreign Application Priority Data
Jan. 22, 2004 (JP) ................ 2004-014421

(51) Int. Cl.
*G06F 12/10* (2006.01)
(52) U.S. Cl. ............ 711/202; 711/203; 711/206; 711/209
(58) Field of Classification Search ............ 711/114, 711/203
See application file for complete search history.

(56) References Cited

U.S. PATENT DOCUMENTS

| | | | | |
|---|---|---|---|---|
| 5,657,470 A | * | 8/1997 | Fisherman et al. | 711/153 |
| 5,913,215 A | * | 6/1999 | Rubinstein et al. | 707/10 |
| 6,170,055 B1 | * | 1/2001 | Meyer et al. | 713/2 |
| 6,463,504 B1 | * | 10/2002 | Ishibashi et al. | 711/114 |
| 6,532,527 B2 | * | 3/2003 | Selkirk et al. | 711/203 |
| 6,857,057 B2 | * | 2/2005 | Nelson et al. | 711/203 |
| 2004/0103261 A1 | * | 5/2004 | Honda et al. | 711/202 |

FOREIGN PATENT DOCUMENTS

| | | |
|---|---|---|
| JP | 9-265360 | 10/1997 |
| JP | 2001-154892 | 6/2001 |
| JP | 2001-350707 | 12/2001 |
| JP | 2002-73393 | 3/2002 |
| JP | 2003-30053 | 1/2003 |
| JP | 2003-316618 | 11/2003 |
| JP | 2003-316715 | 11/2003 |

* cited by examiner

*Primary Examiner*—Jasmine Song
(74) *Attorney, Agent, or Firm*—McGinn IP Law Group PLLC

(57) ABSTRACT

According to an embodiment, virtual logical units are each provided with correlative data between a virtual logical unit number and a real logical unit number. In response to an access request specifying a virtual logical unit number from a host, a correlated real logical unit number is obtained by referring to the correlative data, thereby accessing a real logical unit having the obtained real logical unit number. By changing a real logical unit number correlated to a virtual logical unit number, it is possible to access a plurality of real logical units in a time sharing manner through one virtual logical unit number. Accordingly, it is possible to set the number of accessible logical units to be greater than the number of using logical unit numbers.

18 Claims, 11 Drawing Sheets

FIRST LINK SETTING

LINK RELEASE

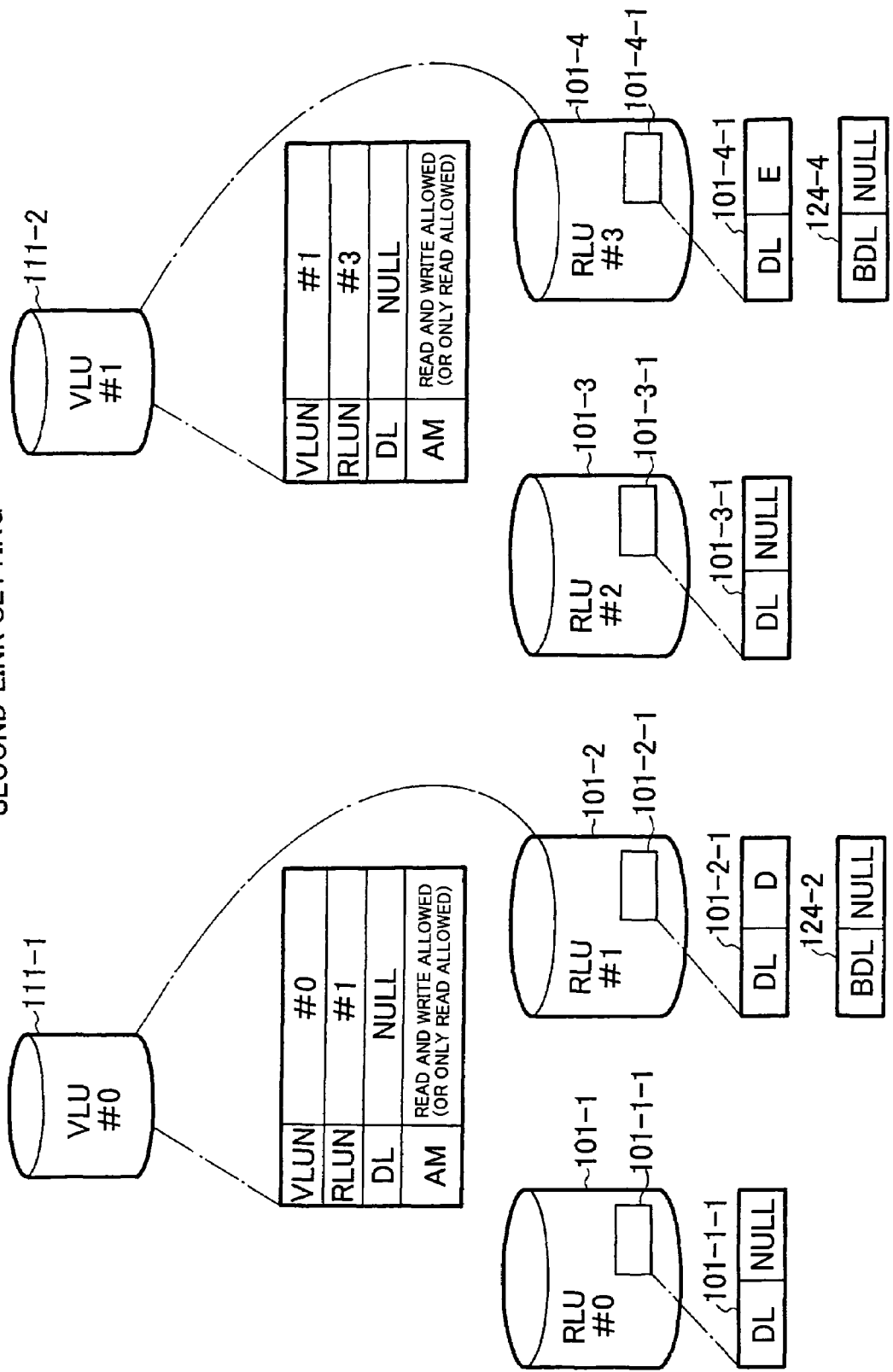

LOGICAL UNIT NUMBER INCREASING DEVICE, AND LOGICAL UNIT NUMBER INCREASING METHOD

BACKGROUND OF THE INVENTION

1. Field of the Invention

The present invention relates to a logical unit number increasing device and a logical unit number increasing method for increasing the number of logical units of a magnetic disk device, an optical recording and reproducing apparatus, a magneto-optical recording and reproducing apparatus, a semiconductor recording and reproducing apparatus, or the like connected to a computer.

2. Description of the Related Art

In the SCSI (Small Computer System Interface) standard for connecting peripheral devices to a computer and so forth, it is possible to allocate a plurality of LUNs (Logical Unit Numbers) to one SCSI ID. On the other hand, there is a limit to the number of SCSI IDs that can be used in one SCSI bus, and there is also a limit to the number of logical unit numbers that can be allocated to one SCSI ID. For example, in the SCSI2 standard, the number of SCSI IDs is 8 at maximum, but is substantially 7 at maximum because one of them is used for a host bus adapter. The number of logical unit numbers that can be allocated to one SCSI ID is 128 at maximum in typical Linux. In this case, assuming that a computer has one SCSI bus and one logical unit is allocated to each logical unit number with respect to each SCSI ID, it is possible to use 7×128=896 logical units at maximum. However, there are those instances where more than 896 logical units are required.

On the other hand, in WINDOWS (registered trademark) one drive letter composed of one alphabet is allocated to each logical unit so that only 26 logical units can be connected to a computer at maximum. Further, in WINDOWS (registered trademark), one drive letter is allocated to each logical unit having one logical unit number with respect to each SCSI ID. For example, if there are 5 logical unit numbers with respect to a certain SCSI ID, only 5 drive letters can be allocated to that SCSI ID.

In order to solve this problem, a plurality of CD-ROM devices are allocated to one drive letter as described in, for example, JP-A-H09-265360.

However, the described technique aims to improve a CD service program, and therefore, although the CD-ROM devices can be connected in a number exceeding a limit, this is not the case with respect to magnetic disk devices that have been widely used as external storage devices.

Further, when many storage devices are simultaneously recognized, there is a possibility of destroying data of an unexpected device by a wrong operation or the like.

SUMMARY OF THE INVENTION

It is an object of the present invention to provide a logical unit number increasing device and a logical unit number increasing method that can connect a computer to logical units, the number of which exceeds a limit of the number of logical units that can be handled according to a standard for connecting peripheral devices to a computer, such as the SCSI standard, or according to an operating system.

It is another object of the present invention to provide a logical unit number increasing device and a logical unit number increasing method that can prevent erroneously destroying data recorded in a logical unit.

According to a first aspect of the present invention, there is provided a logical unit number increasing device for increasing the number of logical units by using a virtual logical unit number allocated to a virtual logical unit and a plurality of real logical unit numbers allocated to a plurality of real logical units, respectively, said logical unit number increasing device comprising: a logical unit number conversion table defining a correlation between the virtual logical unit number allocated to the virtual logical unit and the real logical unit number of one of said plurality of real logical units; a host interface for receiving an access request specifying the access-destination virtual logical unit number from a host; logical unit number converter, responsive to said access request from said host, for referring to said logical unit number conversion table and converting the virtual logical unit number specified by said access request into the real logical unit number correlated to said virtual logical unit number; and a device director interface for feeding to a device director the access request in which the virtual logical unit number has been converted into the real logical unit number by said logical unit number converter.

The logical unit number increasing device may further comprise logical unit number conversion table changer for changing said real logical unit number correlated to said virtual logical unit number to another real logical unit number.

The logical unit number increasing device may further comprise: access mode setter for setting an access mode correlated to said virtual logical unit number to "access forbidden"; and access denial device for denying an access based on an access request specifying said virtual logical unit number during a time when said access mode correlated to said virtual logical unit number is set to "access forbidden" by said access mode setter.

The logical unit number increasing device may further comprise: real logical unit number nullifying device for setting a value of said real logical unit number correlated to said virtual logical unit number to a null value; and access denial device for, during a time when the value of said real logical unit number correlated to said virtual logical unit number is set to the null value by said real logical unit number null g device, denying an access based on an access request specifying the virtual logical unit number correlated to the real logical unit number whose value is set to said null value.

The logical unit number increasing device may further comprise said device director for deriving a physical access destination based on at least said real logical unit number specified by said access request received from said device director interface and accessing said physical access destination.

The logical unit number increasing device may further comprise drive letter transfer device for transferring a drive letter held by the real logical unit having the real logical unit number before being changed by said logical unit number conversion table changer, to the real logical unit having the real logical unit number after being changed by said logical unit number conversion table changer.

The logical unit number increasing device may further comprise: drive letter evacuation device for evacuating a drive letter held by the real logical unit, said real logical unit having the real logical unit number after a change by a first operation of said logical unit number conversion table changer, and said drive letter held by said real logical unit before said change; and drive letter return device for returning the drive letter evacuated by said drive letter evacuation device to said real logical unit when a correlation between said real logical unit having the real logical unit number after the change by said first operation of said logical unit number conversion table changer and said virtual logical unit number has disappeared by a second operation of said logical unit number conversion table changer.

According to a second aspect of the present invention, there is provided a logical unit number increasing method for increasing the number of logical units by using a virtual logical unit number allocated to a virtual logical unit and a plurality of real logical unit numbers allocated to a plurality of real logical units, respectively, said logical unit number increasing method comprising: a step of preparing a logical unit number conversion table defining a correlation between the virtual logical unit number allocated to the virtual logical unit and the real logical unit number of one of said plurality of real logical units; a host interface step of receiving an access request specifying the access-destination virtual logical unit number from a host; a logical unit number conversion step of, responsive to said access request from said host, referring to said logical unit number conversion table and converting the virtual logical unit number specified by said access request into the real logical unit number correlated to said virtual logical unit number; and a device director interface step of feeding to a device director the access request in which the virtual logical unit number has been converted into the real logical unit number in said logical unit number conversion step.

According to a third aspect of the present invention, there is provided a computer program product embodied on a computer-readable medium and comprising codes that, when executed, cause a computer to perform a logical unit number increasing method for increasing the number of logical units by using a virtual logical unit number allocated to a virtual logical unit and a plurality of real logical unit numbers allocated to a plurality of real logical units, respectively, said logical unit number increasing method comprising: a step of preparing a logical unit number conversion table defining a correlation between the virtual logical unit number allocated to the virtual logical unit and the real logical unit number of one of said plurality of real logical units; a host interface step of receiving an access request specifying the access-destination virtual logical unit number from a host; a logical unit number conversion step of, responsive to said access request from said host, referring to said logical unit number conversion table and converting the virtual logical unit number specified by said access request into the real logical unit number correlated to said virtual logical unit number; and a device director interface step of feeding to a device director the access request in which the virtual logical unit number has been converted into the real logical unit number in said logical unit number conversion step.

According to the present invention, a logical unit number specified by a host is used as a virtual logical unit number and access is made to a real logical unit having a real logical unit number corresponding to the virtual logical unit number, and further, the real logical unit number corresponding to the virtual logical unit number can be changed to another real logical unit number. Therefore, the host can use the number of real logical units which is greater than the number of logical unit numbers used by the host.

BRIEF DESCRIPTION OF THE DRAWINGS

FIG. 11 is a diagram for explaining second link setting in the example of the present invention.

DESCRIPTION OF THE PREFERRED EMBODIMENT

Now, a preferred embodiment of the present invention will be described in detail with reference to the drawings.

In this embodiment, it is made possible to allocate to one SCSI ID logical units, the number of which exceeds the number of logical unit numbers allocated to the one SCSI ID. In an example of typical Linux, when, for example, "n" logical unit numbers ($1 \leq n \leq 128$) are allocated to a certain SCSI ID, it is made possible to allocate logical units, the number of which exceeds "n" to that SCSI ID. On the other hand, in case of WINDOWS (registered trademark), when, for example, 5 logical unit numbers are allocated to a certain SCSI ID and five drive letters of D, E, F, G, and H are allocated to the respective logical unit numbers, it is made possible to allocate logical units, the number of which exceeds five to that SCSI ID without changing the drive letters of D, E, F, G, and H.

[Structure]

Figure 1:
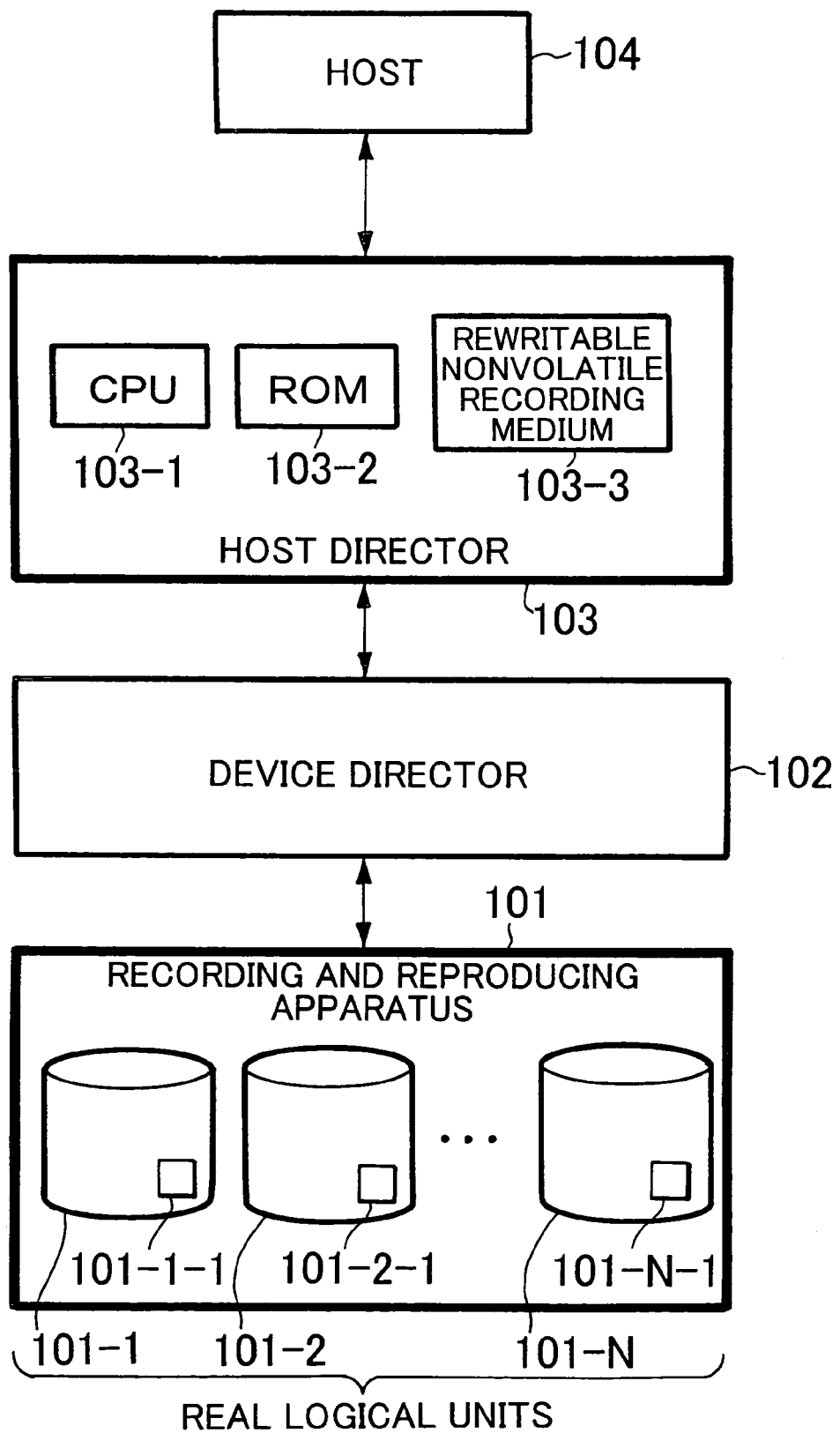
FIG. 1 is a block diagram showing a structure of one SCSI device and a host connected to the SCSI device according to a preferred embodiment of the present invention.

FIG. 1 is a block diagram showing a structure of one SCSI device and a host connected to this SCSI device. One SCSI ID is allocated to the SCSI device shown in FIG. 1. It is possible to allocate one or more logical unit numbers to this SCSI device.

The SCSI device comprises a recording and reproducing apparatus 101, a device director 102, and a host director 103. The device director 102 is connected to the recording and reproducing apparatus 101 and the host director 103, while the host director 103 is connected to a host 104.

One or more real logical units 101-1 to 101-N (N is an integer equal to or greater than 1) can be prepared in the recording and reproducing apparatus 101. The recording and reproducing apparatus 101 is, for example, a disk array and, in this case, the logical units are logical volumes. The recording and reproducing apparatus 101 may be replaced with a reproducing apparatus or a recording apparatus.

In response to an access request to the recording and reproducing apparatus 101 from the host director 103, the device director 102 converts a logical unit number, a logical sector number, and the like specified by the access request into a physical access destination in the recording and reproducing apparatus 101 and accesses the physical access destination.

The host director 103 comprises a CPU 103-1, a ROM (Read Only Memory) 103-2, and a rewritable nonvolatile recording medium 103-3. The CPU 103-1 realizes functions of respective functional sections of the host director 103 by reading and executing a program stored in the ROM 103-2. The rewritable nonvolatile recording medium 103-3 may be separated from the host director 103 as long as accessible from the host director 103 and, for example, may be provided in the device director 102.

Figure 2:
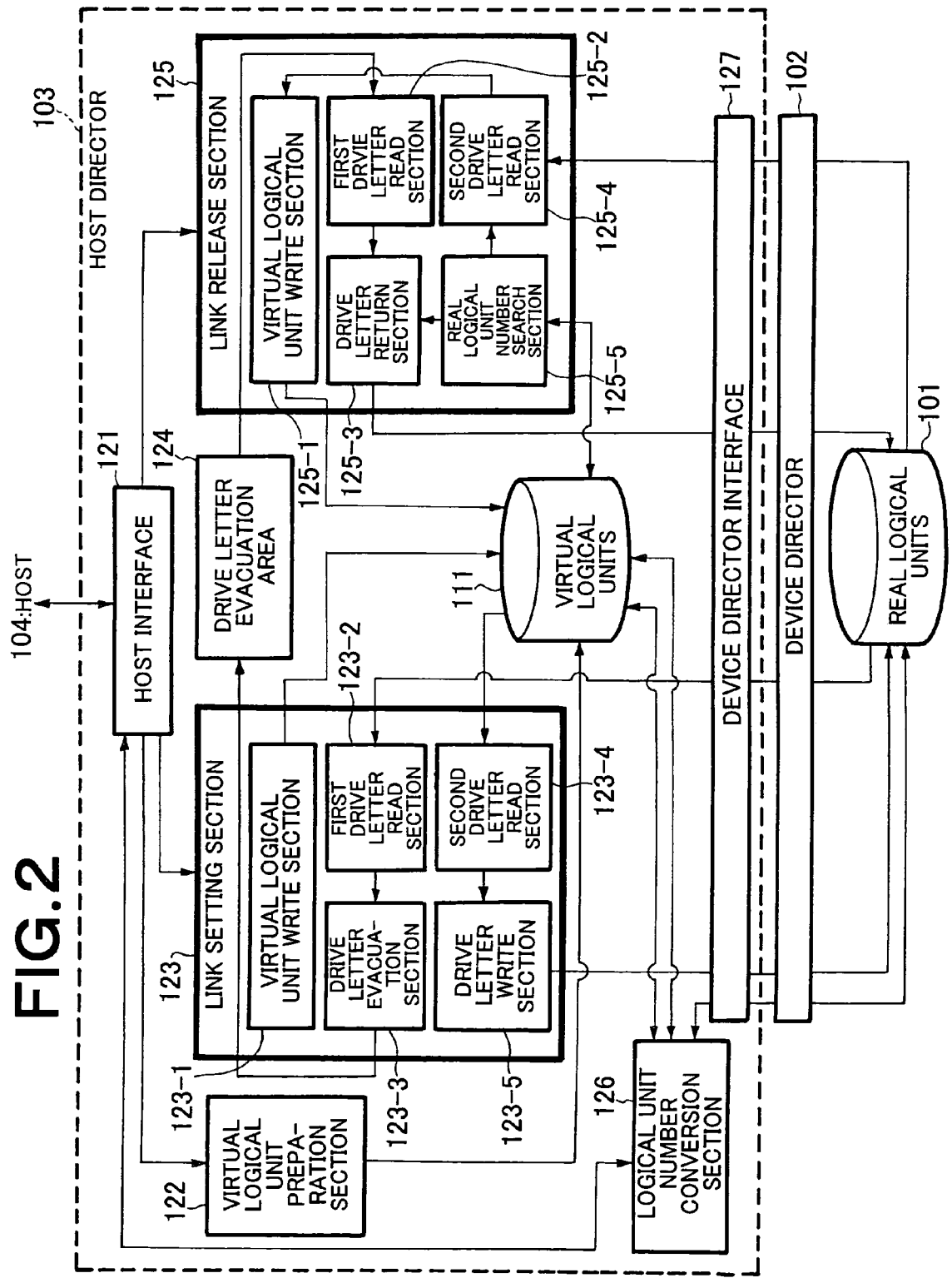
FIG. 2 is a block diagram showing a structure of a host director and so forth shown in FIG. 1.

As shown in FIG. 2, the host director 103 comprises a host interface 121, a virtual logical unit preparation section 122, a link setting section 123, a drive letter evacuation area 124, a link release section 125, a logical unit number conversion section 126, and a device director interface 127.

The host interface 121 and the device director interface 127 comprise hardware and software sections, and functions of the software sections are realized by the ROM 103-2 and the CPU 103-1 that reads and executes the program stored in the ROM 103-2.

The drive letter evacuation area 124 and virtual logical units 111 are prepared in the rewritable nonvolatile recording medium 103-3.

Functions of the virtual logical unit preparation section 122, the link setting section 123, and the link release section 125 are realized by the ROM 103-2 and the CPU 103-1 that reads and executes the program stored in the ROM 103-2.

The link setting section 123 comprises a virtual logical unit write section 123-1, a first drive letter read section 123-2, a drive letter evacuation section 123-3, a second drive letter read section 123-4, and a drive letter write section 123-5.

The link release section 125 comprises a virtual logical unit write section 125-1, a first drive letter read section 125-2, a drive letter return section 125-3, a second drive letter read section 125-4, and a real logical unit number search section 125-5.

Now, description will be given about operation of a logical unit number increasing device according to the preferred embodiment of the present invention.

[Real Logical Unit Preparation]

Before starting the logical unit number increasing device according to this embodiment, the real logical units 101-1 to 101-N are prepared in the recording and reproducing apparatus 101. In order to achieve an effect exhibited by the logical unit number increasing device, the number of the real logical units 101 is set greater than the number of the virtual logical units. Further, in consideration of a case where an operating system issues a command for obtaining the maximum sector number, or the like, the sector size and the number of sectors of the real logical unit are set equal to those of the virtual logical unit, which, however, is not necessarily required depending on the kind of operating system. Further, the real logical unit 101-*i* has a drive letter area 101-*i*-1.

The real logical units 101-1 to 101-N are prepared by the host computer having a special program for managing the device.

[Virtual Logical Unit Preparation]

When necessary, the host 104 gives a virtual logical unit preparation command to the host interface 121. The virtual logical unit preparation command is a vendor unique command among SCSI commands and is a command for adding one virtual logical unit, and has, as arguments, a virtual logical unit number and a capacity (composed of the sector size and the number of sectors) of a virtual logical unit.

When the host interface 121 receives the virtual logical unit preparation command, the virtual logical unit preparation section 122 prepares one virtual logical unit. The virtual logical unit is a logical unit that is virtual and has no data storage area, and is prepared in the rewritable nonvolatile recording medium 103-3.

Figure 3:
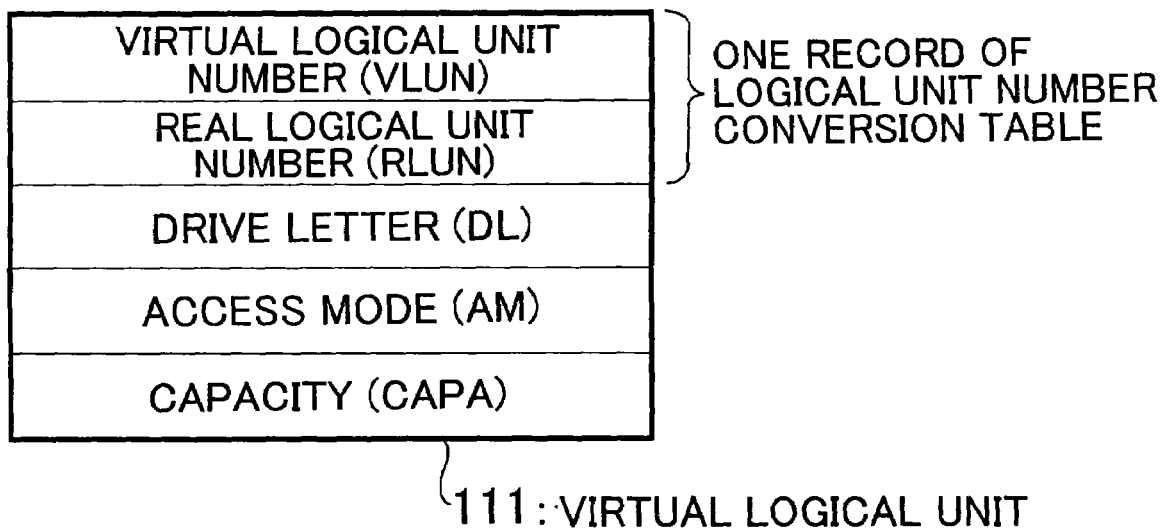
FIG. 3 is a diagram showing a structure of a virtual logical unit according to the preferred embodiment of the present invention.

As shown in FIG. 3, a virtual logical unit 111 has areas of a virtual logical unit number (VLUN), a real logical unit number (RLUN), a drive letter (DL), an access mode (AM), and a capacity (CAPA). Note that a logical unit number conversion table is formed by extracting only a virtual logical unit number and a real logical unit number with respect to one or more virtual logical units. Therefore, the virtual logical unit number and the real logical unit number of one virtual logical unit 111 form one record of the logical unit number conversion table.

Immediately after the preparation of the virtual logical unit in response to the virtual logical unit preparation command, the virtual logical unit number and the capacity have values specified by the command, while the real logical unit number and the drive letter each have a null value (NULL) and the access mode has a value of "access forbidden".

[Link Setting]

When necessary, the host 104 gives a link setting command to the host interface 121. The link setting command is a vendor unique command among the SCSI commands and is a command for setting a link between the virtual logical unit 111 and the real logical unit 101-*i*, and has, as arguments, a virtual logical unit number, a real logical unit number, and an access mode. The access mode normally has a value of "read and write allowed" or "only read allowed", but may take another value.

Figure 4:
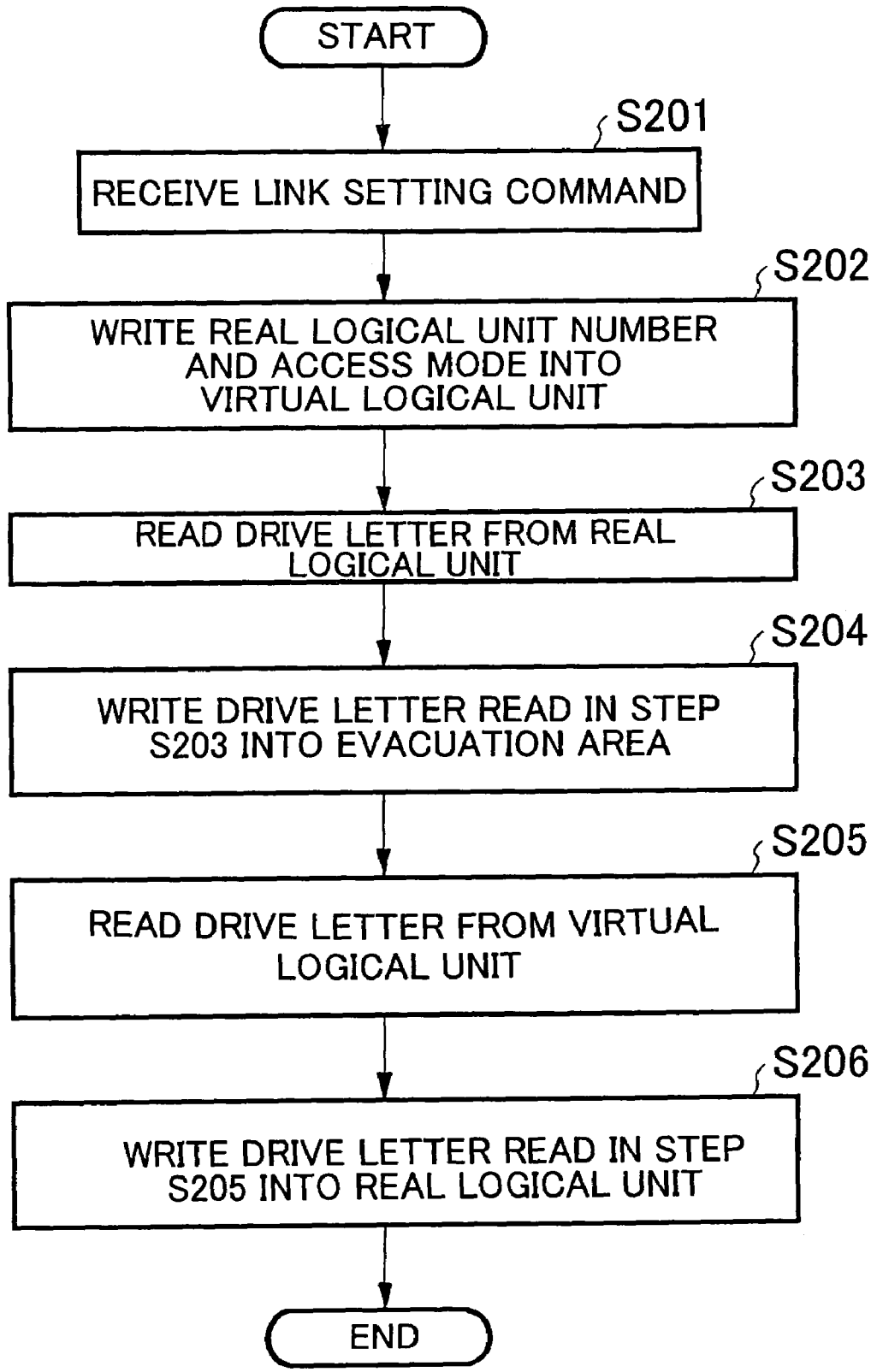
FIG. 4 is a flowchart for explaining operation of the host director in setting a link according to the preferred embodiment of the present invention.

Referring to FIG. 4, when the host interface 121 receives a link setting command (step S201), the virtual logical unit write section 123-1 of the link setting section 123 refers to arguments of the command and writes a real logical unit number and an access mode as the arguments into areas of a real logical unit number and an access mode of a virtual logical unit 111 having a virtual logical unit number as the argument (step S202).

Further, the first drive letter read section 123-2 of the link setting section 123 reads a drive letter stored up to the present time in a drive letter area 101-*i*-1 of a real logical unit (link-destination real logical unit) 101 having the real logical unit number as the argument (step S203).

Further, the drive letter evacuation section 123-3 of the link setting section 123 writes the drive letter read by the first drive letter read section 123-2 into the drive letter evacuation area 124 (step S204). The drive letter written into the drive letter evacuation area 124 is, when the link is released next by a link release command, returned to the drive letter area 101-*i*-1 of the real logical unit being the link destination up to then. By returning the drive letter in this manner, when the operating system accesses the real logical unit using its logical unit number, the operating system can recognize that consistency between the logical unit number of the real logical unit and the drive letter thereof is maintained.

Further, the second drive letter read section 123-4 of the link setting section 123 reads a drive letter stored in an area of drive letter of the virtual logical unit (link-origin virtual logical unit) 111 having the virtual logical unit number as the argument (step S205).

Further, the drive letter write section 123-5 of the link setting section 123 writes the drive letter read by the second drive letter read section 123-3 into the drive letter area 101-*i*-1 of the real logical unit (link-destination real logical unit) 101 having the real logical unit number as the argument (step S206). With this arrangement, it is possible to prevent an operating system such as WINDOWS (registered trademark) from judging that the link-destination real logical unit is a wrong real logical unit.

Note that when an invalid drive letter is written in the area of drive letter of the virtual logical unit (link-origin virtual logical unit) 111 having the virtual logical unit number as the argument immediately after the preparation of the virtual logical unit, the drive letter write section 123-3 of the link setting section 123 writes the invalid drive letter into the drive letter area 101-*i*-1. Upon recognition that the invalid drive letter is written in the drive letter area 101-*i*-1, the operating system writes a drive letter, determined by the operating system, into the drive letter area 101-*i*-1.

[Link Release]

When necessary, the host 104 gives a link release command to the host interface 121. The link release command is a vendor unique command among the SCSI commands and is a command for releasing a link between a virtual logical unit 111 and a real logical unit 101, and has a virtual logical unit number as an argument.

Figure 5:
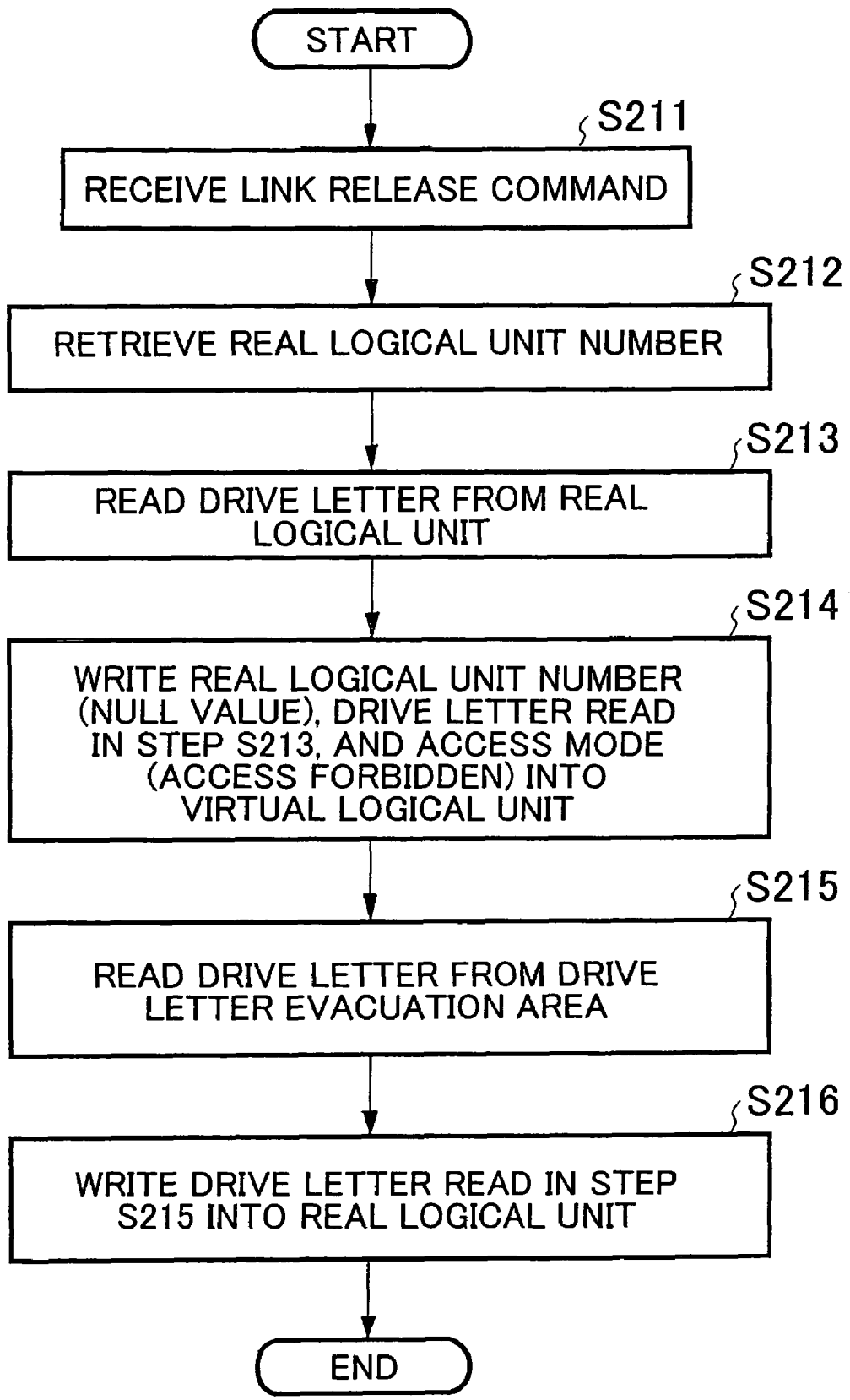
FIG. 5 is a flowchart for explaining operation of the host director in releasing a link according to the preferred embodiment of the present invention.

Referring to FIG. 5, when the host interface 121 receives a link release command (step S211), the real logical unit number search section 125-5 of the link release section 125 retrieves a real logical unit number corresponding to a virtual logical unit number as an argument from a virtual logical unit 111 having the virtual logical unit number as the argument (step S212).

Further, the second drive letter read section 125-4 of the link release section 125 reads a drive letter stored in a drive letter area 101-*i*-1 of a real logical unit (link-destination real logical unit) 101 having the real logical unit number retrieved by the real logical unit number search section 125-5 (step S213) and delivers the read drive letter to the virtual logical unit write section 125-1.

Further, the virtual logical unit write section 125-1 of the link release section 125 writes a null value into an area of real logical unit number of the virtual logical unit (link-origin virtual logical unit) 111 having the virtual logical unit number as the argument, writes the drive letter received from the second drive letter read section 125-4 into an area of drive letter of the virtual logical unit 111, and writes a value of "access forbidden" into an area of access mode of the virtual logical unit 111 (step S214).

Further, the first drive letter read section 125-2 of the link release section 125 reads a drive letter stored in the drive letter evacuation area 124 (step S215).

Further, the drive letter return section 125-3 of the link release section 125 writes the drive letter read by the first drive letter read section 125-2 into the drive letter area 101-*i*-1 of the real logical unit (link-destination real logical unit) 101 having the real logical unit number retrieved by the real logical unit number search section 125-5 (step S216).

With this arrangement, when the correlation between the virtual logical unit and the real logical unit is released, the real logical unit can be correctly recognized by the primary drive letter.

The drive letter written into the virtual logical unit 111 in step S214 is, when this virtual logical unit is linked to a certain real logical unit next by a link setting command, written into a drive letter area of that real logical unit. With this arrangement, even if a virtual logical unit recognized as having a certain drive letter is linked to any real logical unit, it is possible to prevent WINDOWS (registered trademark) from judging that the link-destination real logical unit is a wrong logical unit.

[Access]

Access to a logical unit is made by an access command (write command or read command) belonging to the normal SCSI commands. The host 104 specifies an access-destination logical unit by a logical unit number being an argument of the access command, while the host director 103 handles this logical unit number as a virtual logical unit number.

The logical unit number conversion section 126 accesses a logical unit having the logical unit number as the argument of the access command, reads a real logical unit number written in the accessed logical unit, and converts the logical unit number being the argument of the access command into the read real logical unit number.

The device director interface 127 delivers to the device director 102 the access command in which the logical unit number has been converted by the logical unit number conversion section 126.

When accessing the logical unit having the logical unit number being the argument of the access command, an access mode is also read and, when the read access mode is "access forbidden", a notification of access denial is sent back to the host 104. Therefore, by setting to "access forbidden" an access mode of a virtual logical unit not linked to a real logical unit, it is possible to prevent data of a real logical unit not linked to the virtual logical unit from being rewritten or deleted in error. The same effect can be achieved by setting to a null value a real logical unit number of a virtual logical unit not linked to a real logical unit and by sending back a notification of access denial to the host 104 when a real logical unit number that is read upon accessing a logical unit having a logical unit number being an argument of an access command is a null value.

EXAMPLE

Now, an example of the present invention will be described.

[Real Logical Unit Preparation]

Figure 6:
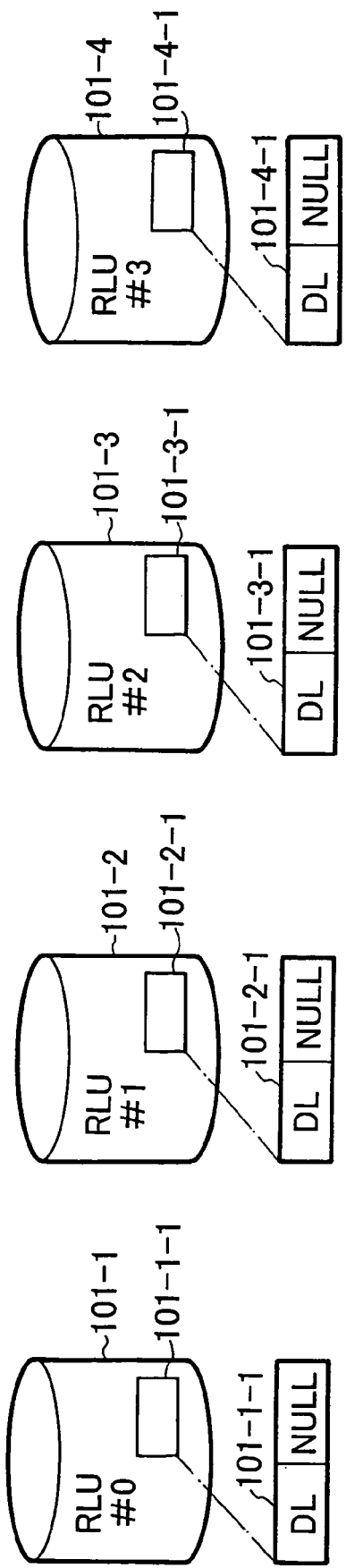
FIG. 6 is a diagram for explaining real logical unit preparation in an example of the present invention.

As shown in FIG. 6, four real logical units 101-1 to 101-4 are prepared in advance. Real logical unit numbers of the real logical units 101-1 to 101-4 are #0 to #3, respectively. Further, a null value (NULL) is written into each of drive letter areas 101-1-1 to 101-4-1 of the real logical units 101-1 to 101-4.

[Virtual Logical Unit Preparation]

Figure 7:
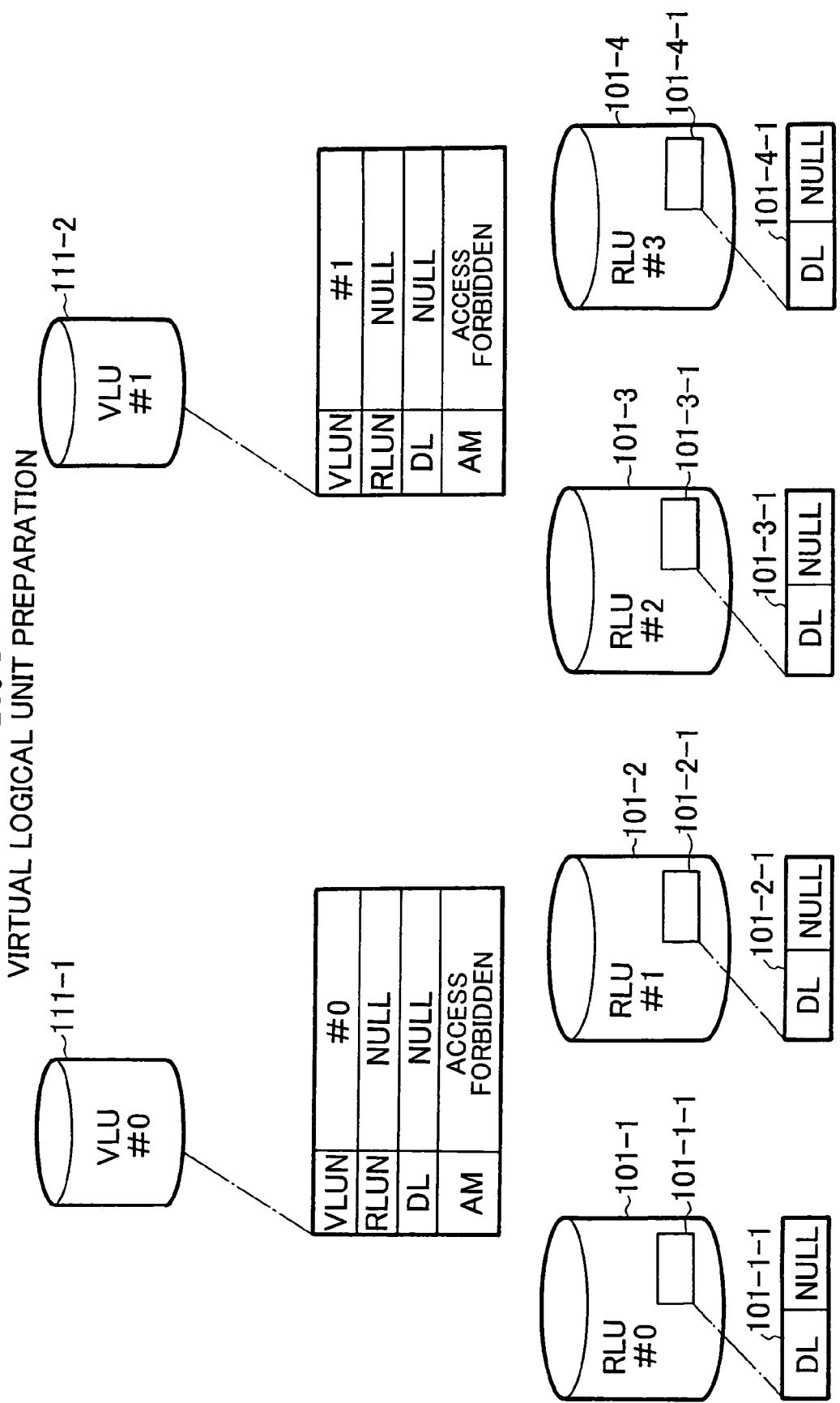
FIG. 7 is a diagram for explaining virtual logical unit preparation in the example of the present invention.

In response to two virtual logical unit preparation commands, two virtual logical units 111-1 and 111-2 are prepared as shown in FIG. 7. A virtual logical unit number, a real logical unit number, a drive letter, and an access mode of the virtual logical unit 111-1 are #0, a null value, a null value, and "access forbidden", respectively. A virtual logical unit number, a real logical unit number, a drive letter, and an access mode of the virtual logical unit 111-2 are #1, a null value, a null value, and "access forbidden", respectively. At this time instant, either of the virtual logical units 111-1 and 111-2 is not linked to any of the real logical units.

[First Link Setting]

Figure 8:
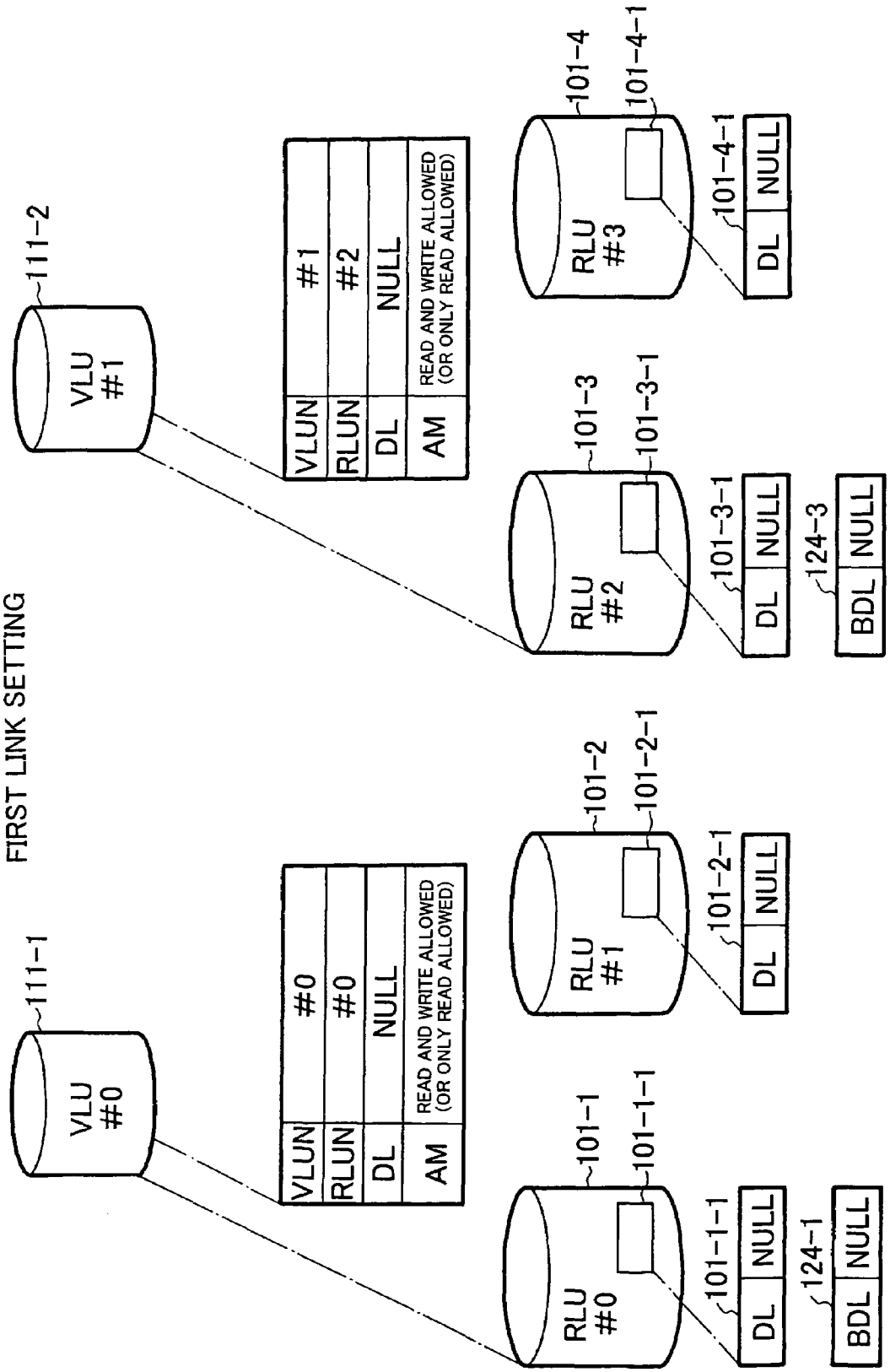
FIG. 8 is a diagram for explaining first link setting in the example of the present invention.

In response to two link setting commands, two links are set as shown in FIG. 8. A virtual logical unit number, a real logical unit number, and an access mode being arguments of one of the link setting commands are #0, #0, and "read and write allowed", respectively. The access mode may be "only read allowed" or the like. A virtual logical unit number, a real logical unit number, and an access mode being arguments of the other link setting command are #1, #2, and "read and write allowed", respectively. The access mode may be "only read allowed" or the like.

As a result, #0 and "read and write allowed" are written into an area of real logical unit number and an area of access mode of the virtual logical unit #0, respectively, while #2 and "read and write allowed" are written into an area of real logical unit number and an area of access mode of the virtual logical unit #1, respectively.

Note that #0 is already written in an area of virtual logical unit number of the virtual logical unit #0, and #1 is already written in an area of virtual logical unit number of the virtual logical unit #1. On the other hand, the null value remains written in an area of drive letter of the virtual logical unit #0, and the null value also remains written in an area of drive letter of the virtual logical unit #1.

Since the null value was written in the drive letter area of the real logical unit #0 before the link setting, a drive letter evacuated in a drive letter evacuation area 124-1 for the real logical unit #0 is also a null value. Likewise, since the null value was written in the drive letter area of the real logical unit #2 before the link setting, a drive letter evacuated in a drive letter evacuation area 124-3 for the real logical unit #2 is also a null value.

A valid drive letter is not always written into a real logical unit by link setting. If a virtual logical unit has never yet been recognized by the host computer, an invalid drive letter written in the virtual logical unit is written into the real logical unit as it is. A drive letter written into a real logical unit is always a drive letter held by a virtual logical unit.

Exclusively, a drive letter is determined and written into a logical unit by the operating system of the host computer when the host computer has recognized the logical unit.

Therefore, as shown in FIG. 8, immediately after the link setting, a null value (NULL) is written into each of the drive letter areas 101-1-1 and 101-3-1.

[Drive Letter Allocation]

Figure 9:
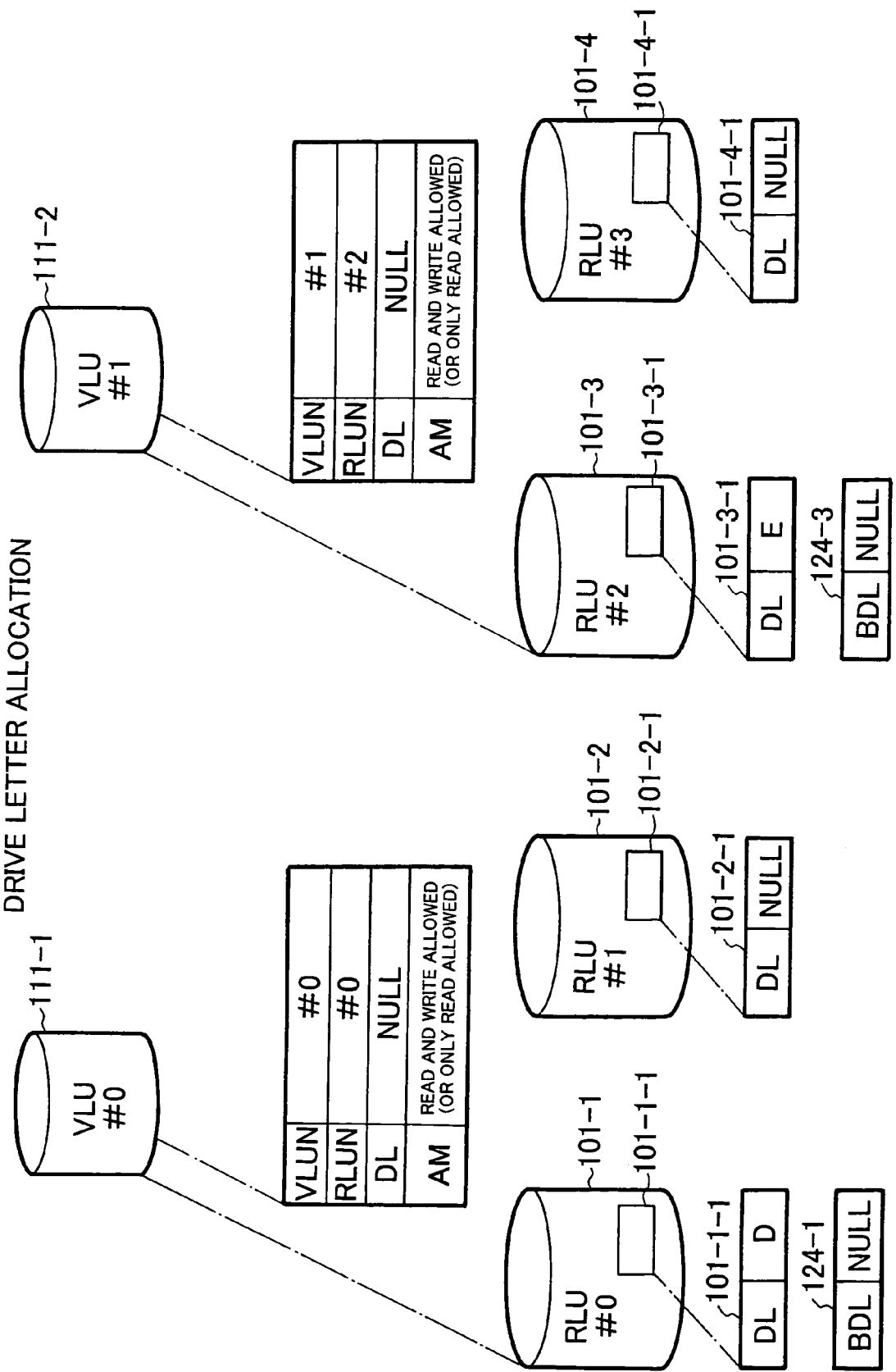
FIG. 9 is a diagram for explaining drive letter allocation in the example of the present invention.

As shown in FIG. 9, upon first accessing the real logical unit 101-1, the operating system recognizes that the null value is written in the drive letter area 101-1-1, and writes a drive letter "D", determined by the operating system, into the drive letter area 101-1-1.

Likewise, upon first accessing the real logical unit 101-3, the operating system recognizes that the null value is written in the drive letter area 101-3-1, and writes a drive letter "E", determined by the operating system, into the drive letter area 101-3-1.

[Link Release]

Figure 10:
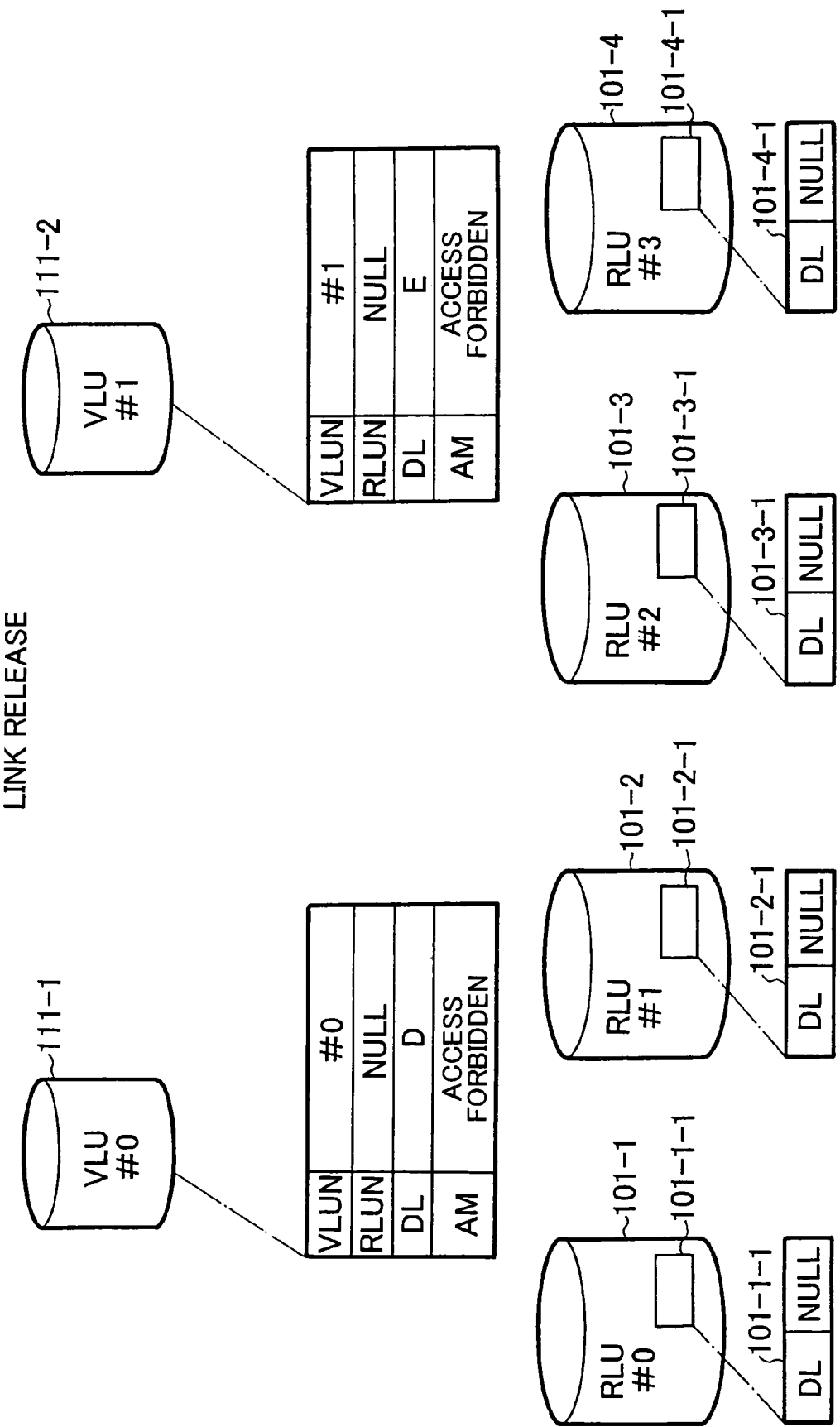
FIG. 10 is a diagram for explaining link release in the example of the present invention.

In response to two link release commands, the two links set as shown in FIGS. 8 and 9 are released so that a state as shown in FIG. 10 is reached. A virtual logical unit number being an argument of one of the link release commands is #0, while a virtual logical unit number being an argument of the other link release command is #1.

As a result, a null value, "D", and "access forbidden" are written into the area of real logical unit number, the area of drive letter, and the area of access mode of the virtual logical unit #0, respectively. The drive letter "D" written into the area of drive letter is what was written in the drive letter area 101-1-1 of the real logical unit #0. On the other hand, a null value, "E", and "access forbidden" are written into the area of real logical unit number, the area of drive letter, and the area of access mode of the virtual logical unit #1, respectively. The drive letter "E" written into the area of drive letter is what was written in the drive letter area 101-3-1 of the real logical unit #2.

Further, the null value evacuated in the drive letter evacuation area 124-1 is returned to the drive letter area 101-1-1 of the real logical unit #0, and the null value evacuated in the drive letter evacuation area 124-3 is returned to the drive letter area 101-3-1 of the real logical unit #2.

[Second Link Setting]

In response to two link setting commands, two links are set as shown in FIG. 11. A virtual logical unit number, a real logical unit number, and an access mode being arguments of one of the link setting commands are #0, #1, and "read and write allowed", respectively. The access mode may be "only read allowed" or the like. A virtual logical unit number, a real logical unit number, and an access mode being arguments of the other link setting command are #1, #3, and "read and write allowed", respectively. The access mode may be "only read allowed" or the like.

As a result, #1 and "read and write allowed" are written into the area of real logical unit number and the area of access mode of the virtual logical unit #0, respectively, and "D" is written into the drive letter area 101-2-1 of the real logical unit #1, while #3 and "read and write allowed" are written into the area of real logical unit number and the area of access mode of the virtual logical unit #1, respectively, and "E" is written into the drive letter area 101-4-1 of the real logical unit #3.

Note that #0 is already written in the area of virtual logical unit number of the virtual logical unit #0, and #1 is already written in the area of virtual logical unit number of the virtual logical unit #1. On the other hand, a null value is newly written into the area of drive letter of the virtual logical unit #0, and a null value is also newly written into the area of drive letter of the virtual logical unit #1.

Since the null value was written in the drive letter area of the real logical unit #1 before the link setting, a drive letter evacuated in a drive letter evacuation area 124-2 for the real logical unit #1 is also a null value. Likewise, since the null value was written in the drive letter area of the real logical unit #3 before the link setting, a drive letter evacuated in a drive letter evacuation area 124-4 for the real logical unit #3 is also a null value.

What is claimed is:

1. A logical unit number increasing device for increasing a number of logical units by using a virtual logical unit number allocated to a virtual logical unit and a plurality of real logical unit numbers allocated to a plurality of real logical units, respectively, said logical unit number increasing device comprising:

a logical unit number conversion table defining a correlation between the virtual logical unit number allocated to the virtual logical unit and the real logical unit number of one of said plurality of real logical units;

a host interface for receiving an access request specifying an access-destination virtual logical unit number from a host;

a logical unit number converter, responsive to said access request from said host, for referring to said logical unit number conversion table and converting the virtual logical unit number specified by said access request into the real logical unit number correlated to said virtual logical unit number;

a device director interface for feeding to a device director the access request in which the virtual logical unit number has been converted into the real logical unit number by said logical unit number converter;

an access mode setter for setting an access mode correlated to said virtual logical unit number to "access forbidden"; and access denial device for denying an access based on an access request specifying said virtual logical unit number during a time when said access mode correlated to said virtual logical unit number is set to "access forbidden" by said access mode setter.

2. The logical unit number increasing device according to claim 1, further comprising a logical unit number conversion table changer for changing said real logical unit number correlated to said virtual logical unit number to another real logical unit number.

3. The logical unit number increasing device according to claim 1, further comprising:
a real logical unit number nullifying device for setting a value of said real logical unit number correlated to said virtual logical unit number to a null value; and
an access denial device for, during a time when the value of said real logical unit number correlated to said virtual logical unit number is set to the null value by said real logical unit number nullifying device, denying an access based on an access request specifying the virtual logical unit number correlated to the real logical unit number whose value is set to said null value.

4. The logical unit number increasing device according to claim 1, further comprising said device director for deriving a physical access destination based on at least said real logical unit number specified by said access request received from said device director interface and accessing said physical access destination.

5. The logical unit number increasing device according to claim 2, further comprising a drive letter transfer device for transferring a drive letter held by the real logical unit having the real logical unit number before being changed by said logical unit number conversion table changer, to the real logical unit having the real logical unit number after being changed by said logical unit number conversion table changer.

6. The logical unit number increasing device according to claim 2, further comprising:
a drive letter evacuation device for evacuating a drive letter held by the real logical unit, said real logical unit having the real logical unit number after a change by a first operation of said logical unit number conversion table changer, and said drive letter held by said real logical unit before said change; and
a drive letter return device for returning the drive letter evacuated by said drive letter evacuation device to said real logical unit when a correlation between said real logical unit having the real logical unit number after the change by said first operation of said logical unit number conversion table changer and said virtual logical unit number has disappeared by a second operation of said logical unit number conversion table changer.

7. A logical unit number increasing method for increasing a number of logical units by using a virtual logical unit number allocated to a virtual logical unit and a plurality of real logical unit numbers allocated to a plurality of real logical units, respectively, said logical unit number increasing method comprising:
a step of preparing a logical unit number conversion table defining a correlation between the virtual logical unit number allocated to the virtual logical unit and the real logical unit number of one of said plurality of real logical units;
a host interface step of receiving an access request specifying an access-destination virtual logical unit number from a host;
a logical unit number conversion step of, responsive to said access request from said host, referring to said logical unit number conversion table and converting the virtual logical unit number specified by said access request into the real logical unit number correlated to said virtual logical unit number;
a device director interface step of feeding to a device director the access request in which the virtual logical unit number has been converted into the real logical unit number in said logical unit number conversion step;
an access mode setting step of setting an access mode correlated to said virtual logical unit number to "access forbidden"; and
an access denial step of denying an access based on an access request specifying said virtual logical unit number during a time when said access mode correlated to said virtual logical unit number is set to "access forbidden" by said access mode setting step.

8. The logical unit number increasing method according to claim 7, further comprising a logical unit number conversion table changing step of changing said real logical unit number correlated to said virtual logical unit number to another real logical unit number.

9. The logical unit number increasing method according to claim 7, further comprising:
a real logical unit number nullifying step of setting a value of said real logical unit number correlated to said virtual logical unit number to a null value; and
an access denial step of, during a time when the value of said real logical unit number correlated to said virtual logical unit number is set to the null value by said real logical unit number nullifying step, denying an access based on an access request specifying the virtual logical unit number correlated to the real logical unit number whose value is set to said null value.

10. The logical unit number increasing method according to claim 7, further comprising a device directing step of deriving a physical access destination based on at least said real logical unit number specified by said access request received from said device director interface step and accessing said physical access destination.

11. The logical unit number increasing method according to claim 8, further comprising a drive letter transfer step of transferring a drive letter held by the real logical unit having the real logical unit number before being changed by said logical unit number conversion table changing step, to the real logical unit having the real logical unit number after being changed by said logical unit number conversion table changing step.

12. The logical unit number increasing method according to claim 8, further comprising:
a drive letter evacuation step of evacuating a drive letter held by the real logical unit, said real logical unit having the real logical unit number after a change by a first operation of said logical unit number conversion table changing step, and said drive letter held by said real logical unit before said change; and
a drive letter return step of returning the drive letter evacuated by said drive letter evacuation step to said real logical unit when a correlation between said real logical unit having the real logical unit number after the change by said first operation of said logical unit number conversion table changing step and said virtual logical unit number has disappeared by a second operation of said logical unit number conversion table changing step.

13. A computer program product embodied on a computer-readable medium and comprising codes that, when executed, cause a computer to perform a logical unit number increasing method for increasing a number of logical units by using a virtual logical unit number allocated to a virtual logical unit and a plurality of real logical unit numbers allocated to a plurality of real logical units, respectively, said logical unit number increasing method comprising:
a step of preparing a logical unit number conversion table defining a correlation between the virtual logical unit number allocated to the virtual logical unit and the real logical unit number of one of said plurality of real logical units;

a host interface step of receiving an access request specifying the access-destination virtual logical unit number from a host;

a logical unit number conversion step of, responsive to said access request from said host, referring to said logical unit number conversion table and converting the virtual logical unit number specified by said access request into the real logical unit number correlated to said virtual logical unit number;

a device director interface step of feeding to a device director the access request in which the virtual logical unit number has been converted into the real logical unit number in said logical unit number conversion step;

an access mode setting step of setting an access mode correlated to said virtual logical unit number to "access forbidden"; and an access denial step of denying an access based on an access request specifying said virtual logical unit number during a time when said access mode correlated to said virtual logical unit number is set to "access forbidden" by said access mode setting step.

14. The computer program product according to claim 13, wherein said method further comprises a logical unit number conversion table changing step of changing said real logical unit number correlated to said virtual logical unit number to another real logical unit number.

15. The computer program product according to claim 13, wherein said method further comprises:

a real logical unit number nullifying step of setting a value of said real logical unit number correlated to said virtual logical unit number to a null value; and an access denial step of, during a time when the value of said real logical unit number correlated to said virtual logical unit number is set to the null value by said real logical unit number nullifying step, denying an access based on an access request specifying the virtual logical unit number correlated to the real logical unit number whose value is set to said null value.

16. The computer program product according to claim 13, wherein said method further comprises a device directing step of deriving a physical access destination based on at least said real logical unit number specified by said access request received from said device director interface step and accessing said physical access destination.

17. The computer program product according to claim 14, wherein said method further comprises a drive letter transfer step of transferring a drive letter held by the real logical unit having the real logical unit number before being changed by said logical unit number conversion table changing step, to the real logical unit having the real logical unit number after being changed by said logical unit number conversion table changing step.

18. The computer program product according to claim 14, wherein said method further comprises:

a drive letter evacuation step of evacuating a drive letter held by the real logical unit, said real logical unit having the real logical unit number after a change by a first operation of said logical unit number conversion table changing step, and said drive letter held by said real logical unit before said change; and a drive letter return step of returning the drive letter evacuated by said drive letter evacuation step to said real logical unit when a correlation between said real logical unit having the real logical unit number after the change by said first operation of said logical unit number conversion table changing step and said virtual logical unit number has disappeared by a second operation of said logical unit number conversion table changing step.

* * * * *